US006198046B1

United States Patent
Moodie

(10) Patent No.: US 6,198,046 B1
(45) Date of Patent: Mar. 6, 2001

(54) CHILD RESISTANT ELECTRICAL RECEPTACLE COVER

(76) Inventor: John Moodie, 125 SE. 1st Ave., Apt. 1, Delray Beach, FL (US) 33444

( * ) Notice: Subject to any disclaimer, the term of this patent is extended or adjusted under 35 U.S.C. 154(b) by 0 days.

(21) Appl. No.: 09/363,860

(22) Filed: Jul. 28, 1999

Related U.S. Application Data

(60) Provisional application No. 60/094,568, filed on Jul. 30, 1998.

(51) Int. Cl.$^7$ ............................... H02G 3/14; H05K 5/03
(52) U.S. Cl. ............................................. 174/67; 220/242
(58) Field of Search .............................. 174/67; 220/242, 220/3.8

(56) References Cited

U.S. PATENT DOCUMENTS

| D. 283,221 | * | 4/1986 | West | 174/67 X |
|---|---|---|---|---|
| 2,761,112 | * | 8/1956 | Torcivia | 220/242 X |
| 4,070,078 | * | 1/1978 | Chrones | 339/44 R |
| 4,134,516 | * | 1/1979 | Sullo | 220/242 |
| 4,159,858 | * | 7/1979 | Toraya | 174/67 X |
| 4,302,624 | * | 11/1981 | Newman | 174/67 |
| 4,895,999 | * | 1/1990 | Calderon | 174/67 |
| 5,264,662 | * | 11/1993 | Kennedy | 174/67 |
| 5,556,289 | * | 9/1996 | Holbrook, Jr. | 174/67 X |

* cited by examiner

*Primary Examiner*—Dean A. Reichard
(74) *Attorney, Agent, or Firm*—Robert M. Downey, PA

(57) ABSTRACT

A device includes a base plate attachable to an electric outlet and an insert fitted to the base plate and having one or more central openings for exposing the receptacles of the electric outlet. A pair of opposing door members hingedly attach to the base plate and are operable between an open position to allow insertion of a plug of an electrical cord into the receptacle, and a closed position to provide a protective shield surrounding an enclosed chamber and the one or more receptacles of the outlet. The opposing door members include flange portions extending partially along a peripheral edge for overlapping engagement with an inner surface adjacent the peripheral edge of the opposite door, preventing insertion of an object between the doors when the device is closed. Correspondingly positioned cutout portions along the peripheral edges of the opposing door members align to create an opening sized and configured to accommodate passage of the electrical cord therethrough, thereby permitting the cord to remain plugged into the receptacle with the doors in the closed position. Latches on the top and bottom of each door lock the doors in the closed position. The latches and flange portions function, in combination, to provide a child resistant safety feature, requiring both doors to be simultaneously unlocked and opened in order to gain access to the receptacles.

10 Claims, 5 Drawing Sheets

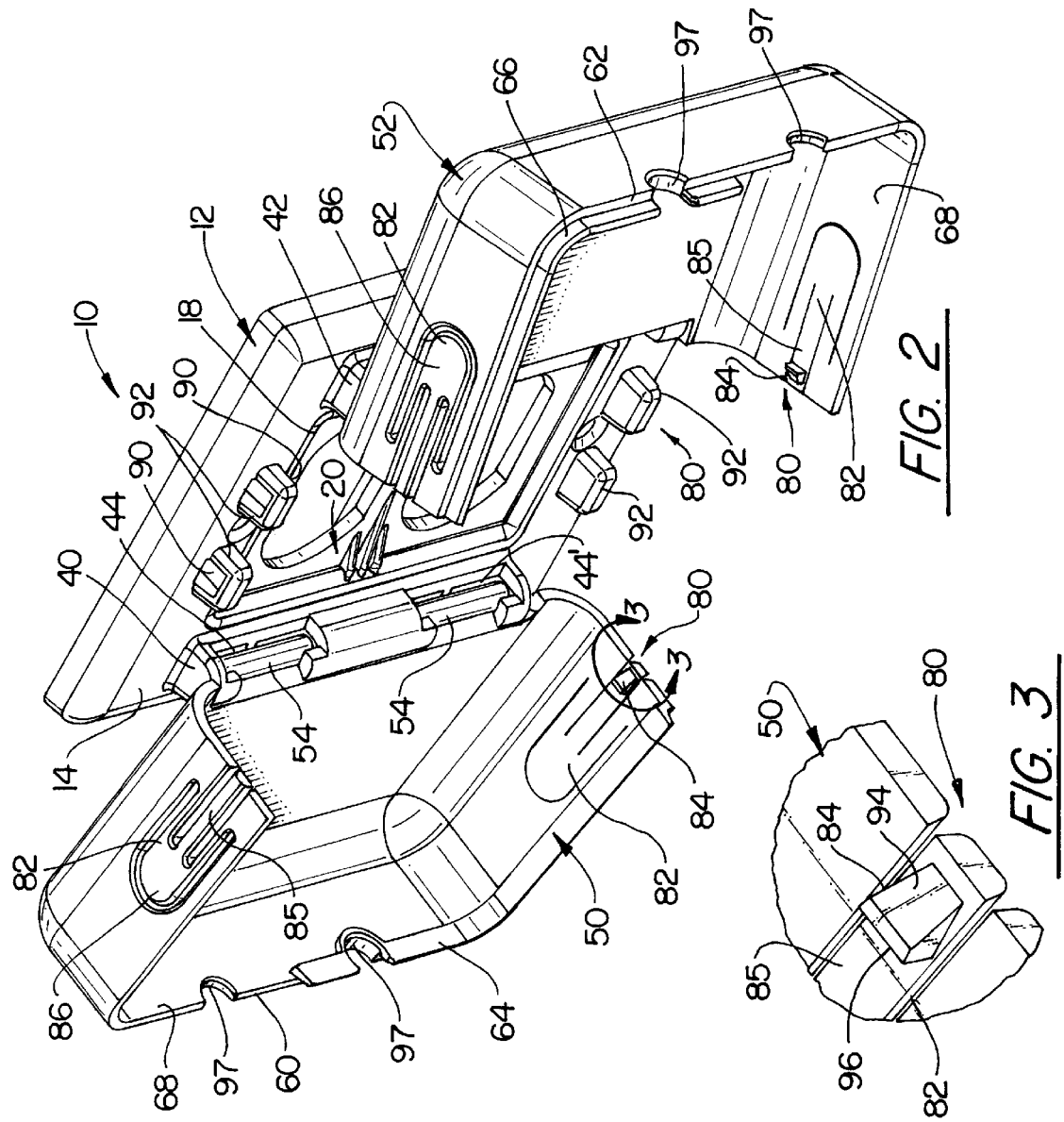

CHILD RESISTANT ELECTRICAL RECEPTACLE COVER

This application claims benefit to provisional application No. 60/094,568 filing date Jul. 30, 1998.

BACKGROUND OF THE INVENTION

1. Field of the Invention

The present invention relates to a protective cover device for electric outlets and, more particularly, to a protective device attachable to an electric outlet and including means to cover the electric receptacles/sockets of the outlet when the outlet is not being used, as well as when one or more electric cords are plugged into the outlet receptacles.

2. Description of the Related Art

Electric outlets, generally comprising one or more receptacles or sockets, present a serious safety hazard to children. Often, children are tempted to poke objects such as paper clips, forks, or toys into the slotted socket openings, resulting in serious injury and possibly death.

In the past, others have proposed various devices to prevent and/or discourage children from tampering with electric outlets. For instance, the art is crowded with various cover devices which attach to an electric outlet and cover the receptacles when they are not being used. Of particular interest are cover devices which allow an electrical cord to be plugged into the receptacles with the device closed, so that the receptacles are/guarded even when in use. However, some of these devices are quite complex and cannot be manufactured and marketed to the consumer at a cost effective price. Other cover devices do not adequately protect against tampering. Another problem associated with many of the above-described outlet cover devices is the inability to quickly remove the plug from the receptacle in an emergency.

On the other hand, others have proposed rather simplistic devices, including covers which plug-in to the receptacles/sockets. While these devices are somewhat effective to protect young children from injury, they must be removed in order to permit use of the outlet. Once removed, they are no longer effective and a child may be injured when an electric cord is plugged into the outlet.

Accordingly, there still exists an urgent need for a protective cover for electric outlets which is specifically designed to prevent a child from accessing the outlet, at all times, with or without electric cords plugged into the outlet receptacles.

SUMMARY OF THE INVENTION

The present invention is directed to a device including a base plate attachable to an electric outlet and an insert fitted to the base plate and having one or more central openings for exposing the receptacles of the electric outlet. A pair of opposing door members hingedly attach to the base plate and are operable between an open position to allow insertion of a plug of an electrical cord into the receptacle, and a closed position to provide a protective shield surrounding an enclosed chamber and the one or more receptacles of the outlet. The opposing door members include flange portions extending partially along a peripheral edge for overlapping engagement with an inner surface adjacent the peripheral edge of the opposite door, preventing insertion of an object between the doors when the device is closed. Correspondingly positioned cutout portions along the peripheral edges of the opposing door members align to create an opening sized and configured to accommodate passage of the electrical cord therethrough, thereby permitting the cord to remain plugged into the receptacle with the doors in the closed position. Latches on the top and bottom of each door lock the doors in the closed position. The latches and flange portions cooperate with each other to require both doors to be simultaneously unlocked and opened in order to gain access to the receptacles.

OBJECTS AND ADVANTAGES OF THE INVENTION

It is a primary object of the present invention to provide a protective cover for electric outlets which is structured to prevent a child from inserting objects into the receptacles of an electric outlet, while still permitting an electric cord to be plugged into the outlet.

It is still a further object of the present invention to provide a protective cover for electric outlets which forms a protective shield surrounding an enclosed chamber and the receptacles of the electric outlet, and which is specifically designed to prevent insertion of an object, such as a knife, screwdriver, paper clip, etc., inside of the enclosed chamber, thereby preventing electric shock, injury and possible death.

It is yet a further object of the present invention to provide a protective cover for electric outlets which is resistant to tampering by children.

It is still a further object of the present invention to provide a protective cover for electric outlets which includes a highly attractive appearance.

It is still a further object of the present invention to provide a protective cover for electric outlets which prevents tampering with the electric receptacles/sockets of the outlets at all times, both when electric cords are plugged into the outlet and when the outlet is not in use.

It is yet a further object of the present invention to provide a protective cover for electric outlets which allows an electrical cord to be unplugged from the receptacle of the outlet while the device is closed and protectively shielding the outlet.

It is yet a further object of the present invention to provide a protective cover for electric outlets which can be manufactured cost-effectively and marketed at a price which is affordable to most homeowners.

These and other objects and advantages of the present invention will be more readily apparent with reference to the following detailed description and the accompanying drawings.

BRIEF DESCRIPTION OF THE DRAWINGS

For a fuller understanding of the nature of the present invention, reference should be made to the accompanying drawings in which:

FIG. 2 is a top, front perspective view of the protective cover shown with door members thereof in an open position;

FIG. 3 is an isolated view of a lock device of the protective cover taken from the area indicated as 3 in FIG. 2;

Like reference numerals refer to like parts throughout the several views of the drawings.

DETAILED DESCRIPTION OF THE PREFERRED EMBODIMENTS

Figure 1:
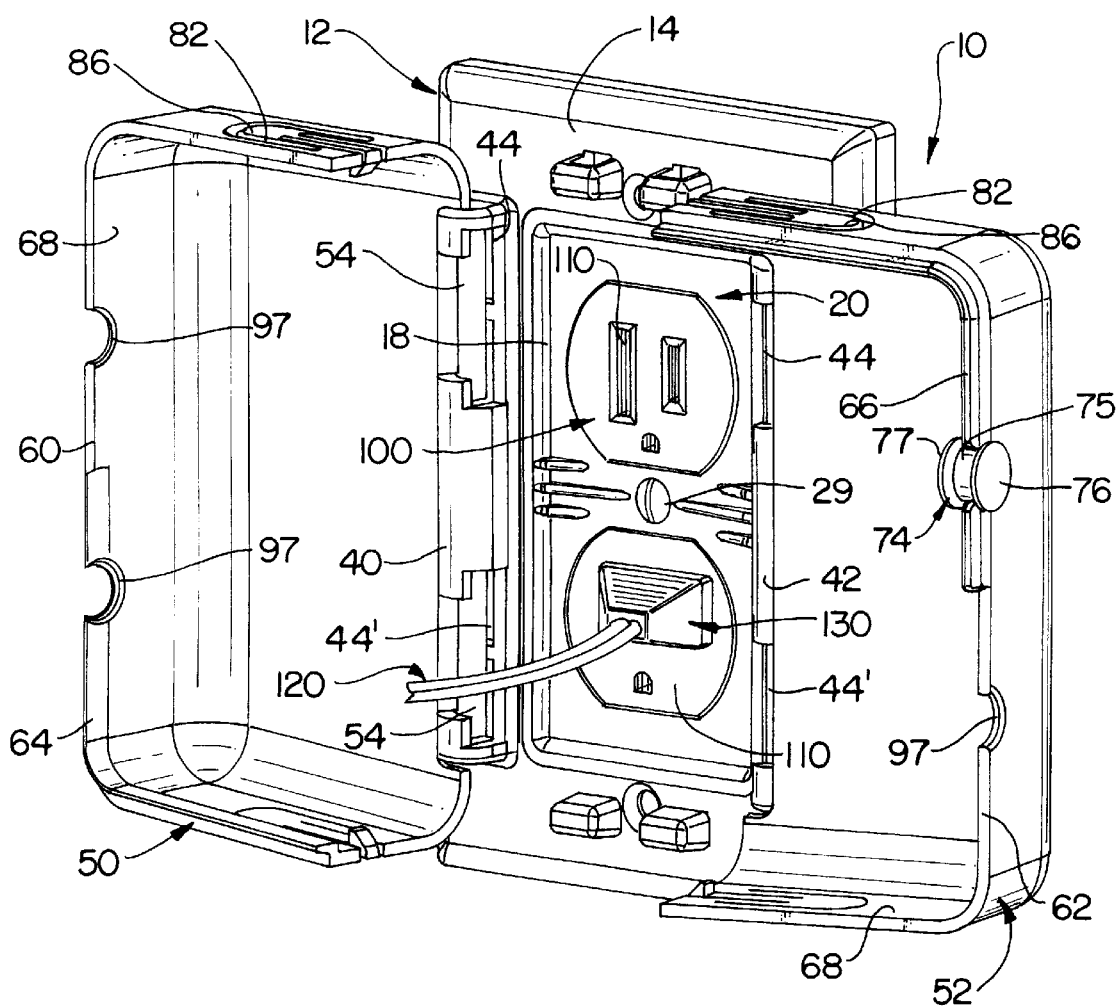
FIG. 1 is a front perspective view of the protective cover fitted to an electric outlet, shown with the doors of the cover open to allow an electrical cord to be plugged into a receptacle of the outlet.

The child resistant electrical receptacle cover device is shown throughout the several views of the drawings, in accordance with various embodiments thereof, and is generally indicated as 10. The device 10 includes a base plate 12 having a front face 14 and a rear face 16. A central rectangular opening 18 formed in the base plate 12 is sized and configured for fitted receipt of an insert panel 20 therein. The insert panel 20 includes one or more openings 22 therethrough for exposing the receptacles 110 of the electric outlet 100. More specifically, the insert panel forms a boarder around the receptacles 110, covering an open front of the outlet, and thereby protectively shielding the outlet wiring from exposure.

In one embodiment, seen in FIGS. 1–6, the insert panel 20 is provided with a pair of openings 22 (upper and lower) which are sized for congruent receipt of the outlet receptacles therethrough so that the front face of the receptacles are exposed and easily accessible for plugging one or more electrical cords into the receptacles.

Figure 8:
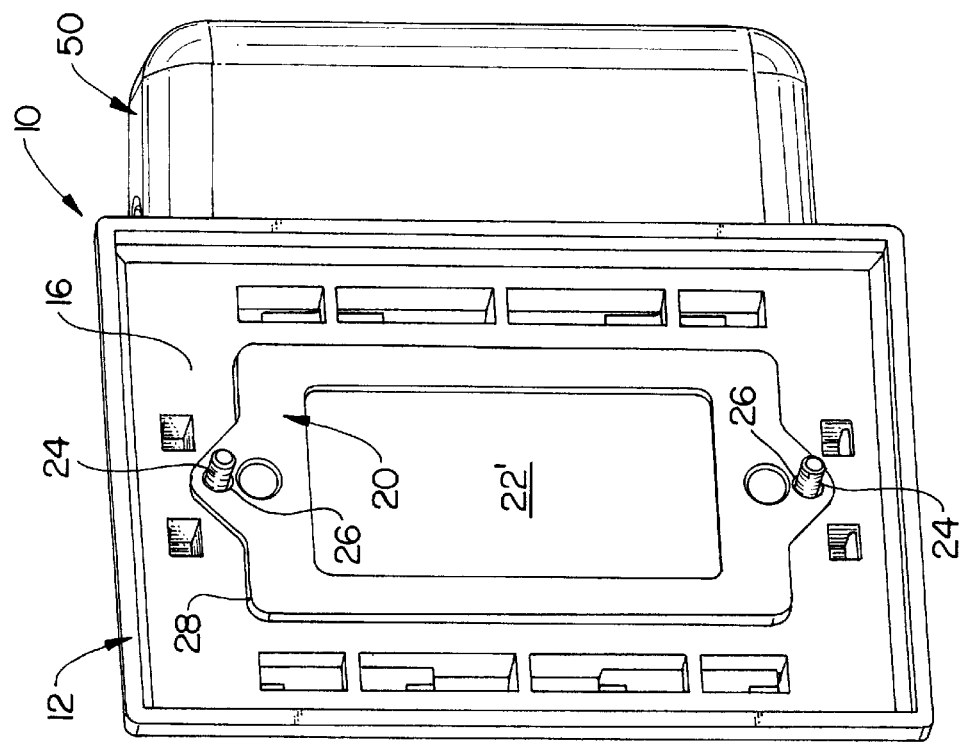
FIG. 8 is a rear perspective view of the device shown in FIG. 7.
Figure 7:
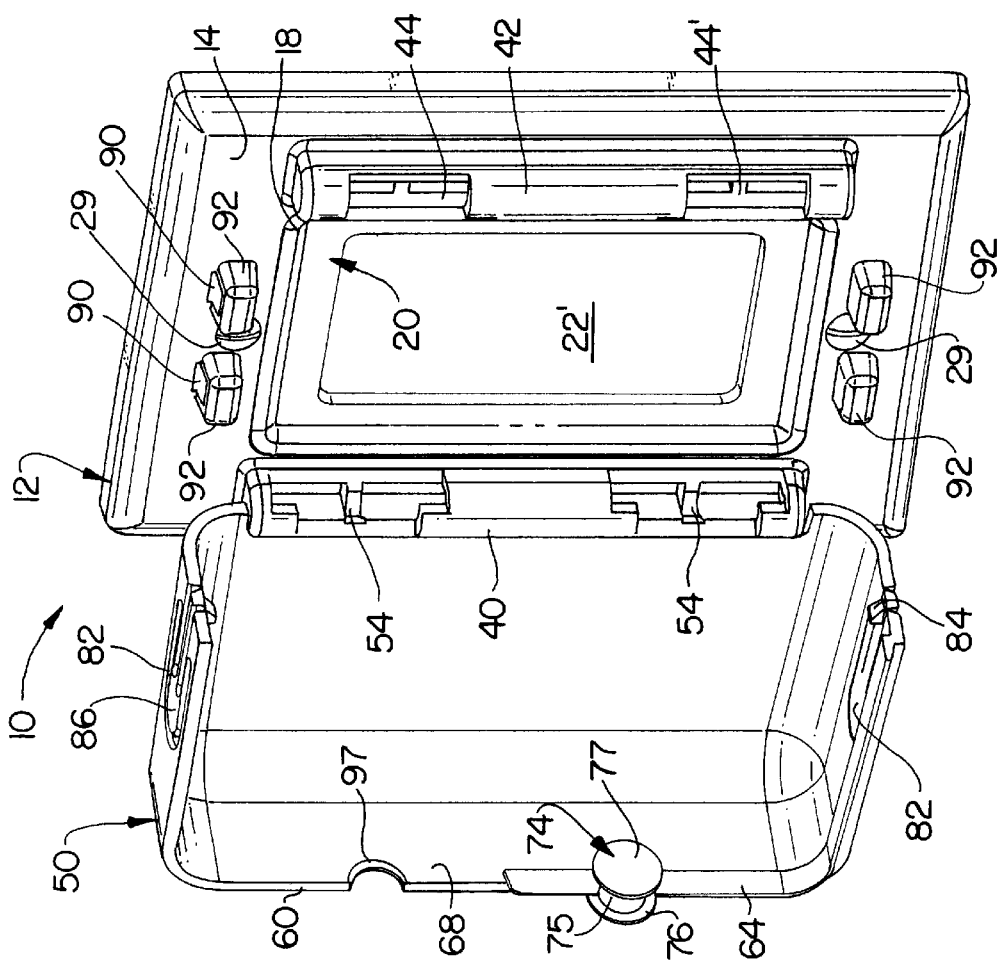
FIG. 7 is a front perspective view of the protective cover device, shown with one of the doors removed and a DECORA™ insert fitted thereto.

In another embodiment, shown in FIGS. 7–8, the insert panel 20 is provided with a single elongate, generally rectangular opening 22' which is specifically sized and configured for congruent receipt of a DECORA™ receptacle therethrough.

In either of the embodiments, the insert panel 20 is fitted to the rear face 16 of the base plate 12. A protruding screw channel, formed on the base plate, serves as a guide for attachment of the insert panel 20. More specifically, in the embodiments of FIGS. 1–6, a central protruding cylindrical screw channel 24 formed on the base plate extends through an aperture 26 between the upper and lower openings 22 of the insert panel, positioning the insert panel against the rear face 16 of the base plate 12 so that the front surface adjacent the peripheral side edges 28 of the insert panel 20 are pressed against the rear face 16 of the base plate, with the upper and lower openings properly positioned relative to the base plate. The base plate is then attached to a standard duplex outlet, with a screw 29 fastened through the central screw opening and passing through the protruding channel 24 for threaded engagement with a correspondingly positioned threaded aperture in the outlet. Upon tightening the screw, the base plate and insert panel are pressed tight against the outlet and wall surrounding the outlet, with the receptacles 1 10 received through the upper and lower openings 22.

In the embodiment of FIGS. 7 and 8, the base plate is provided with a pair of protruding screw channels 24 on the rear face 16 for alignment with threaded apertures of a DECORA™ outlet. The protruding screw channels 24 serve as guides for passage through apertures 26 formed in the upper and lower ends of the insert panel 20. In this embodiment, two screws 29 are used for fastening the base plate and insert panel to the outlet, with the insert panel sandwiched between the rear face of the base plate and the outlet, in the same general manner as described in connection with the embodiment of FIGS. 1–6.

Figure 4:
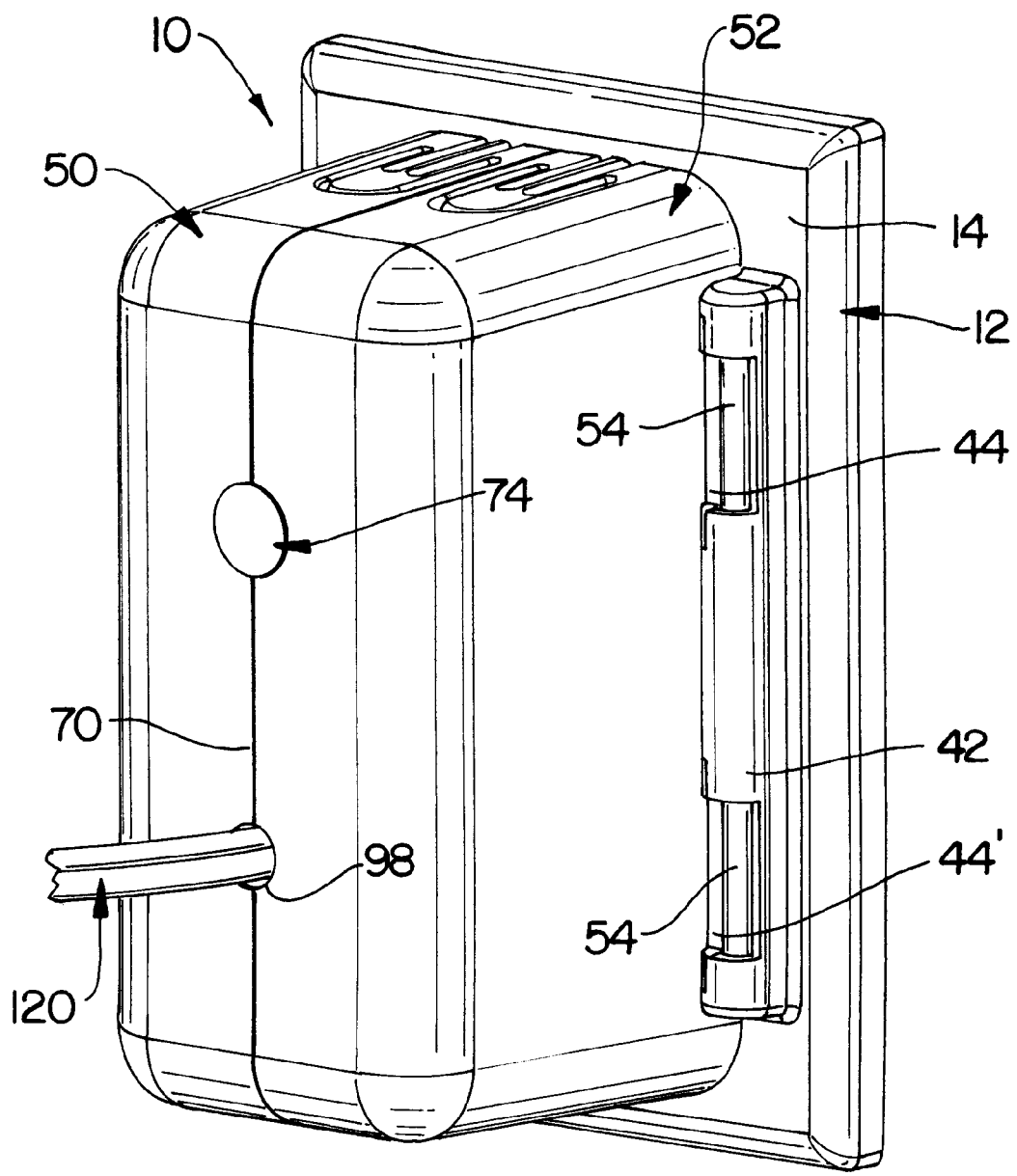
FIG. 4 is a front perspective view of the protective cover, shown with the doors in a closed, locked position.
Figure 6:
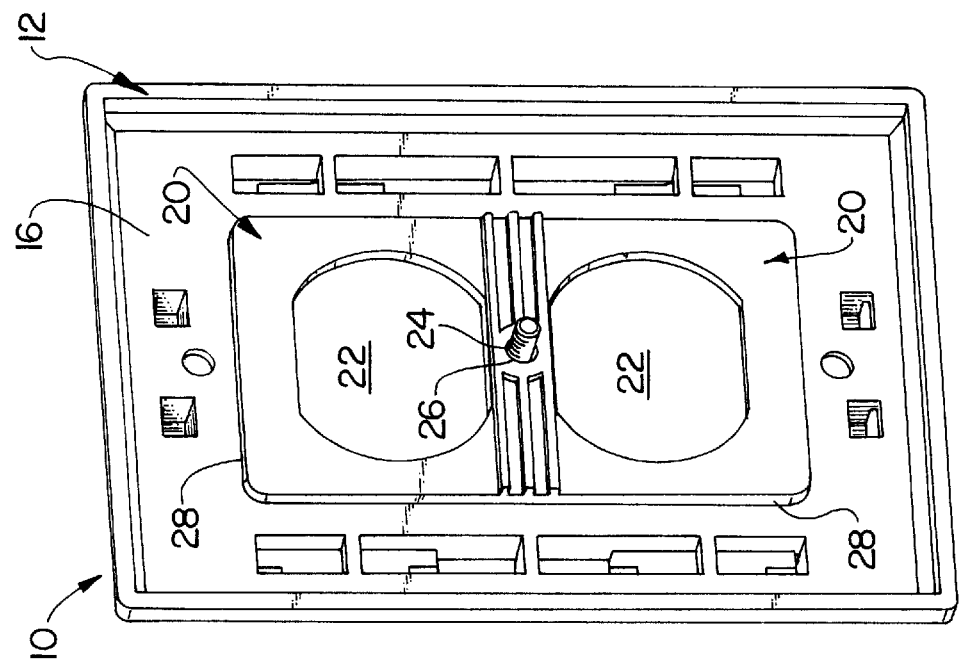
FIG. 6 is a rear perspective view of the device shown in FIG. 5.
Figure 5:
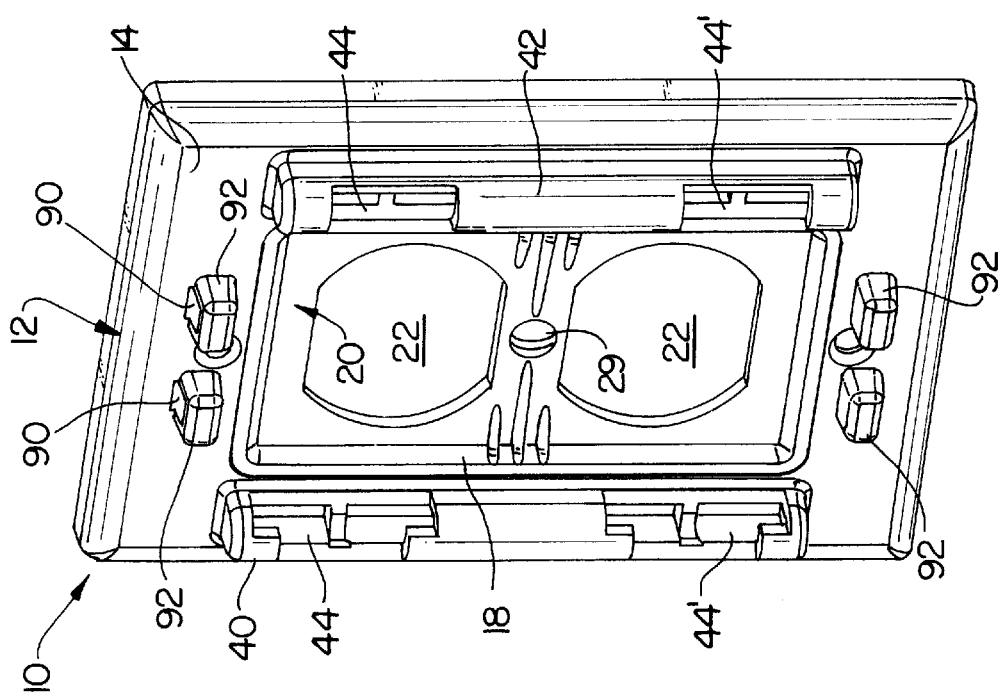
FIG. 5 is a front perspective view of the protective cover device, shown with the doors removed and a standard duplex insert fitted thereto.

The base plate is provided with hinge members 40, 42 on opposite sides of the central opening. The hinge members 40, 42 are each provided with upper and lower pivot sockets 44, 44'. A pair of doors 50, 52 hingedly attach to the base plate 12 and are movable between an opened position to expose the receptacles of the outlet and a closed position to protectively cover the receptacles. The doors 50, 52 are provided with hinge pins 54 which are pivotally received within the upper and lower sockets 44, 44' of the hinge members 40, 42 on the base plate, permitting swinging movement of the doors between the opened position, as seen in FIG. 2, and the closed position, as seen in FIG. 4. Each of the doors 50, 52 further includes a peripheral edge portion 60, 62, respectively, which is structured and disposed for mating, fitted engagement with the correspondingly aligned peripheral edge portion of the opposite door when the doors 50, 52 are moved to the closed position, as seen in FIG. 4 The peripheral edge portion 60, 62 of each of the doors is further provided with a flange portion extending partially about the peripheral edge portion of the door. More specifically, the door 50 includes flange portion 64 extending along the bottom half of the peripheral edge portion 60 thereof, while the door 52 includes flange portion 66 extending along the upper half of peripheral edge portion 62 thereof. The flanged portions 64, 66 are specifically structured for overlapping engagement with an opposing inner surface 68 adjacent the peripheral edge portion of the opposite door. When the doors 50, 52 are in the closed position, the flanged portions 64, 66 cooperate to form a continuous overlap about the entire length of the mating peripheral edge portions 60, 62 of the doors, thereby preventing insertion of an object between the seam 70 formed between the peripheral edges. More specifically, the flanged portions 64, 66, covering the seam 70 from the inside, prevent insertion of a flat device, such as a knife, between the doors when in the closed position.

The overlapping flange portions 64, 66 of the opposing doors 50, 52 further provide for a cooperative interlocking of the doors, when in the closed position, preventing one door from being opened while the other door remains closed. This provides a child resistant safety feature, requiring both doors 50, 52 to be opened simultaneously. Specifically, the lower flange portion 64 on the first door 50 engages the inner surface 68 of the second door 52, preventing the first door 50 from being opened while the second door 52 remains in the closed, locked position. Likewise, the upper flange portion 66 on the second door 52 engages the inner surface 68 of the first door 50, preventing the second door 52 from being opened while the first door 50 remains in the closed, locked position. Thus, the lower and upper flange portions 64, 66 on the first and second doors 50, 52, respectively, interlock the doors in the closed position, requiring the first and second doors to be opened simultaneously.

The doors 50, 52 are further provided with lock means 80 for releasably locking the doors in the closed position. Specifically, each of the doors is provided with latch members 82, including an upper latch member and a lower latch member. In a preferred embodiment, the latch members 82 are integrated with the structure of the door and include a catch element 84 on the end of a stem 85 extending from a depression tab 86. Upon depressing the tab 86 inwardly, relative to the doors and closed chamber surrounded by the doors, the catch element 84 is lifted from seated engagement within pockets 90 formed in protruding members 92 extending from the front face 14 of the base plate. The catch element 84 includes an angled surface 94 structured to permit closing of the doors and movement of the catch element 84 into locked engagement within the pockets 90 on the base plate. A shoulder 96 opposite of the angled surface 94 on the catch element 84 engages within the pocket, when received therein, to thereby lock the doors 50, 52 closed relative to the base plate 12. In order to unlock and open the doors, each of the latch members 82 (a total of four) must be operated simultaneously by depressing the depression tabs 86 on the upper and lower sides of the doors. This can be done using the index finger and thumb of each hand, to simultaneously depress the four depression tabs 86 of both doors and then simultaneously swing the doors to the open position. As this operation requires an adult size hand, as well as a considerable amount of coordination and knowledge of how to operate the device 10, the likelihood of a child of 8 years or less being able to open the doors from the locked position is highly remote. To this end, the combination of the structure of the flange portions 64, 66 on the doors 50, 52 and the latch members 82 provides a highly effective child resistant safety feature with the intent of preventing a child from accessing and/or tampering with the outlet 100 and receptacles 110.

To permit one or more electrical cords 120 to remain plugged into the receptacles 110, with the doors in the closed position, cutout portions 97 are formed along the mating peripheral front edge portions of the doors. The cutout portions 97 on each door 50, 52 are correspondingly positioned relative to one another and are sized and configured to form a passage hole 98 of sufficient size to accommodate passage of the electrical cord 120 therethrough, with the plug 130 of the electrical cord 120 within the chamber behind the closed doors. The formed passage hole 98, through which the cord extends, is specifically sized to permit movement of the electrical cord 120 therethrough, thereby allowing the cord to be pulled in order to remove the plug 130 from the receptacle 110 with the doors 50, 52 in the closed position. The formed passage hole 98 is further sized and configured to prevent passage of the plug 130 therethrough, so that the plug 130 cannot be removed from the closed chamber with the doors in the closed, locked position.

In the preferred embodiment, the doors 50, 52 are specifically sized and configured so that the formed chamber, defined by the enclosed space behind the closed doors, is large enough to permit the plug 130 of the electrical cord 120 to be removed from the receptacle 110 when the doors are closed and locked, by pulling on the electrical cord externally of the device. Cord hole covers or caps 74 are provided for covering the cord passage holes 98 when an electrical cord is not extending therethrough. In this manner, a child is unable to poke an object (e.g., screwdriver, paper clip, scissors, etc.) through the cord passage holes 98 when an electrical cord is not plugged into the receptacle. The cord hole cap 74, as best seen in FIG. 1, includes a cylindrical central portion 75 sized and configured for snap fit engagement within the cutout portions 97 of the doors. Enlarged disc members 76, 77 on opposite ends of the central cylindrical portion 75 are received on opposite sides of the door, surrounding and covering the mating cutout portions 97 of the doors, so that when the doors are in the closed position, the cord passage holes 98 are completely plugged and covered. The enlarged discs 76, 77 on the opposite ends of the cap 74 prevent removal of the cap 74 from the passage hole 98 when the doors are in the closed position. A retention lanyard (not shown) may be integrally molded to the cap 74 and attached to the door to prevent loss of the caps when removed from the cord passage holes.

While the instant invention has been shown and described in accordance with preferred and practical embodiments thereof, it is recognized that departures may be made from the instant disclosure which, therefore, should not be limited except as set forth in the following claims as interpreted under the doctrine of equivalents.

What is claimed is:

1. A safety device for covering receptacles of an electric outlet comprising:

a base plate including a front face, a rear face, and an open central zone;

means on said base plate for attaching said base plate to said electric outlet;

an insert panel including a border surrounding at least one receptacle opening, said border being sized and configured for engagement against said rear face of said base plate so that said at least one receptacle opening is positioned within said open central zone, said at least one receptacle opening being structured and disposed for congruent receipt of one of the receptacles of the electric outlet so that the one of receptacles is exposed on said front face of said base plate;

first and second doors hingedly affixed to said base plate and movable between an open position to facilitate access to the receptacles of the outlet and a closed position to cover the receptacles and thereby defining an enclosed chamber behind said first and second closed doors, said first and second doors including peripheral edge portions structured and disposed for mating engagement when said doors are in said closed position, said peripheral edge portions forming a seam between said first and second doors when in said closed position;

flange means for overlapping said seam and for interlocking said first and second doors when in said closed position so that said first and second doors are not capable of opening independently of one another;

latch means for releasably locking said first and second doors in said closed position, said latch means including an upper latch member and a lower latch member on each of said first and second doors, said upper and lower latch members each including a catch element being structured and disposed for releasable, interlocking engagement within a respective pocket on said base plate, wherein said upper and lower latch members on each of said doors are required to be operated simultaneously to release said catch elements from said pockets prior to opening said first and second doors from said closed position;

cord passage means formed in said first and second doors to accommodate passage of an electrical cord therethrough while a plug on the end of the electrical cord remains within said chamber, said cord passage means being sized and configured to permit travel of the electrical cord therethrough, and said cord passage means preventing passage of the plug of the electrical cord therethrough with said first and second doors in said closed position;

cap means for covering said cord passage means when the electrical cord is not extending therethrough; and said first and second doors being sized and configured to allow the plug of the electrical cord to be removed from one of the receptacles of the outlet with said first and second doors remaining in said closed position.

2. The safety device as recited in claim 1 wherein said open central zone of said base plate includes at least one window opening sized and configured for exposing at least one of the receptacles of the electric outlet and a portion of said insert panel surrounding the at least one of receptacles.

3. The safety device as recited in claim 1 wherein said open central zone of said base plate includes a plurality of window openings, each of said window openings being sized and configured to expose at least one of the receptacles of the electric outlet and a portion of said insert panel surrounding the at least one of receptacles.

4. The safety device as recited in claim 1 wherein said base plate includes alignment means on said rear face for positioning and aligning said insert panel relative to said base plate.

5. A safety device for covering receptacles of an electric outlet comprising:

a base plate including a front face, a rear face, and an open central zone;

means on said base plate for attaching said base plate to said electric outlet;

an insert panel including a border surrounding at least one receptacle opening, said border being sized and configured for engagement against said rear face of said base plate so that said at least one receptacle opening is positioned within said open central zone, said at least one receptacle opening being structured and disposed for congruent receipt of one of the receptacles of the electric outlet so that the one of the receptacles is exposed on said front face of said base plate;

first and second doors hingedly affixed to said base plate and movable between an open position to facilitate access to the receptacles of the outlet and a closed position to cover the receptacles and thereby defining an enclosed chamber behind said first and second closed doors, said first and second doors including peripheral edge portions structured and disposed for mating engagement when said doors are in said closed position, said peripheral edge portions forming a seam between said first and second doors when in said closed position;

flange means for overlapping said seam and for interlocking said first and second doors when in said closed position so that said first and second doors are not capable of opening independently of one another;

latch means for releasably locking said first and second doors in said closed position, said latch means including an upper latch member and a lower latch member on each of said first and second doors, said upper and lower latch members each including a catch element being structured and disposed for releasable, interlocking engagement within a respective pocket on said base plate, wherein said upper and lower latch members on each of said doors are required to be operated simultaneously to release said catch elements from said pockets prior to opening said first and second doors from said closed position; and cord passage means formed in said first and second doors to accommodate passage of an electrical cord therethrough while a plug on the end of the electrical cord remains within said chamber, said cord passage means being sized and configured to permit travel of the electrical cord therethrough, and said cord passage means preventing passage of the plug of the electrical cord therethrough with said first and second doors in said closed position.

6. The safety device as recited in claim 5 wherein said open central zone of said base plate includes at least one window opening sized and configured for exposing at least one of the receptacles of the electric outlet and a portion of said insert panel surrounding at least one of the receptacles.

7. The safety device as recited in claim 5 wherein said open central zone of said base plate includes a plurality of window openings, each of said window openings being sized and configured to expose at least one of the receptacles of the electric outlet and a portion of said insert panel surrounding at least one of the receptacles.

8. The safety device as recited in claim 5 wherein said base plate includes alignment means on said rear face for positioning and aligning said insert panel relative to said base plate.

9. The safety device as recited in claim 5 further including cap means for covering said cord passage means when the electrical cord is not extending therethrough.

10. The safety device as recited in claim 5 wherein said first and second doors are sized and configured to allow the plug of the electrical cord to be removed from one of the receptacles of the outlet with said first and second doors remaining in said closed position.

* * * * *